Patented Aug. 16, 1938

2,126,925

UNITED STATES PATENT OFFICE 2,126,925

PIGMENTS IN OIL AND METHOD OF MAKING THE SAME

Lonnie W. Ryan, Westfield, and Earl Knudt Fischer, Elizabeth, N. J., assignors, by mesne assignments, to Interchemical Corporation, New York, N. Y., a corporation of Ohio No Drawing. Application January 12, 1934, Serial No. 706,436

13 Claims. (Cl. 134—58)

This invention relates to new and useful improvements in pigments in oil and the manufacture of such pigments and relates particularly to transferring aqueous pigment pulps directly to pigments in oil without the necessity of going through the usual drying and dry milling or disintegrating operations.

It is a purpose of this invention to increase the facility with which a pigment in aqueous pigment pulps can be transferred to pigments in oil and to increasing the uniformity, degree of dispersion, and strength of the pigments in oil.

We have discovered that pigments can be transferred with increased facility directly from aqueous pulps of pigment particles to pigments in oil by having present the right kind and amount of organic compounds which act as wetting agents and thereby form an adsorption pigment complex having a greater affinity for oil than for water. By oil we mean linseed oil which is either raw, mechanically refined, blown or cooked; China-wood oil; and other organic liquids commonly used in the paint, printing ink, linoleum and similar processing industries.

Certain types of pigments will adsorb from liquids a monomolecular film of polar organic compounds when such compounds are present and normally the greater the polarity of the liquid or the greater the polarity of the molecules of the polar compounds the greater is the adsorption phenomenon. Polar organic compounds are those whose molecules respond in a different degree to the forces of molecular attraction at different positions in the molecules. The polar end of the molecule contains at least one group comprising one or more atoms so arranged that the group is active in the sense that it manifests to a marked degree such phenomena as physical adsorption, entering into chemical double decomposition with other organic or inorganic compounds or condensing by addition with other organic or inorganic compounds and the like. The nonpolar or inactive end of these molecules manifests such phenomena to a less degree.

In the adsorption by certain types of pigments of polar organic compounds it is believed that the polar or active part is adsorbed adjacent to the pigment surfaces and that the nonpolar or inactive part of the molecule extends into the liquid, just as in the case of stabilized emulsions the polar end of the molecule of the stabilizing agent is adsorbed, and in this case, dissolved in the water and the nonpolar end of the molecule of the stabilizing agent is dissolved in the oil.

We have learned that those polar compounds which are most effective in facilitating the transfer of aqueous pigment pulps to pigments in oil are those which are in general substantially insoluble in water but which are readily dispersible as a solution or colloidally in oil.

While this invention is not to be regarded as dependent upon the correctness of any theory advanced herein as to the action of those polar organic compounds which we have found to be particularly effective in transferring pigments in water to pigments in oil, it is believed that such compounds have such polarity that the polar ends of such compounds are attracted by the surfaces of certain pigments so as to cause such compounds to become adsorbed thereon, and since the nonpolar ends of these compounds are definitely more soluble in oil than in water it would not seem unreasonable to assume that water is expelled on account of the attraction of the polar end of these molecules by the pigment surfaces and the simultaneous attraction of the oil by the nonpolar ends of these molecules due to greater solubility of the nonpolar ends of the molecules in the oil.

The polar compounds which we have found to be especially efficient in facilitating the transfer of pigments in water to pigments in oil are, for example, the mono, di or trialkyl-amines containing at least one hydrocarbon radical which radical in itself contains at least three carbon atoms such as the type of amines containing alkyl radicals having at least three carbon atoms (e. g., propyl, butyl, amyl, hexyl, etc. radicals) such as, for example, mono amyl amine. It is to be understood that the invention in its broader aspects includes hydroxy alkyl amines having at least one alkyl radical containing at least three carbon atoms, such as, for example, butanol amine and hydroxyhexylamine. It is also to be understood that the radical having at least three carbon atoms forms part of the amine structure and is not a group added to an amine by condensation with fatty acids for example. Amines either alone or condensed with other compounds are referred to herein as amines but amines which contain a radical having at least three carbon atoms in the amine typifying structure are to be distinguished from condensation products of amines which do not have any such radicals. Nevertheless an amine having at least one alkyl radical containing at least three carbon atoms may be employed in the practice of this invention not only alone but also as condensed with carboxylic acids such as the fatty and resin acids, e. g., abietic, stearic, ricinoleic, oleic, or linoleic acids or their derivatives including the alkyloxy derivatives, and are also effective in high degree as condensed with sulfonic acids or their derivatives such as the halogen substitution products. When an amine is used as such, it is probable that some condensation with the free fatty or resin acid of the oil takes place. In order to simplify the terminology, the terms "fatty acid" and "soap-forming acid" are used to comprehend the aforementioned substances which condense with the amines.

In certain cases it is a feature of this invention that such compounds as those above mentioned are added to an aqueous pulp of a pigment either before or after the addition of oil to the pulp and in a precomposed state, that is, as a definite entity prior to the incorporation of the same into the mixture or into the aqueous or oil phases thereof so that the organic compound in controlled amounts can be thoroughly and uniformly dispersed through the mixture to thereby become effectively adsorbed by the pigment from the water dispersion.

The compounds above mentioned may be employed in transferring pigments from water to oil such, for example, as the iron blues, the chrome greens, lithopone, lithol toners, the titanium dioxide pigments, organic lake pigments, etc.

Thus we have found that iron blues may be transferred directly from water to linseed oil in the form of a lithographic varnish by having present a small amount of mono amyl amine condensed with a fatty acid in the form of mono amyl amine ricinoleate or linoleate, for example.

Certain pigments on account of their composition and/or the presence of small amounts of foreign substances on the surfaces of their particles may be transferred to a certain extent directly from aqueous pulps to pigments in oil without the addition of specific wetting agents. Even with such pigments the use of wetting agents according to this invention may be practiced for the purpose of facilitating the transfer from water to oil.

Some pigments such as basic carbonate of lead are believed to react with fatty acids contained in oil in such a way as to make possible the transfer of such pigments from water to oil. It is a feature of this invention that pigments which are substantially non-reactive with oil either having or not having a fatty acid content, may be readily transferred using the organic compounds above mentioned. Moreover, even in the case of such pigments as basic carbonate of lead some of the compounds herein mentioned may be employed to facilitate the transfer thereof from water to oil. It is one feature of this invention that pigments containing a metal or a compound of a metal may be transferred from water to oil using a wetting agent above described which does not contain a compound of the metal which is in the pigment. Thus it is within the scope of this invention to employ in facilitating the transfer of a lead containing pigment from an aqueous pulp to a pigment in oil, a wetting agent of the types above referred to that does not contain a lead compound, e. g. mono amylamine. It is also within the scope of this invention to transfer pigments such as the iron blues and others above mentioned by the employment of wetting agents above mentioned such as mono amylamine ricinoleate.

There are many ways in which our invention may be put into practice. A wetting agent may be added to the aqueous pulp or to the oil prior to mixing or to the pigment-water-oil mixture. The mixture may of course be carried out in accordance with any of the well known methods and in any of the well known types of mixers. In certain cases we have found the application of heat substantially above normal atmospheric temperatures during the mixing to be desirable, heat in some cases facilitating the replacing of the water by the oil. The heat may be applied by impinging a flame on a metallic mixer, it may be applied by means of steam in a steam jacketed mixer, it may be applied by direct injection of super-heated steam into the mixer, etc. We do not wish to be limited as to any method for the application of heat during mixing or the degree of heat employed. We have learned that during mixing a very large percentage and in some cases practically all of the water separates and may be removed by decantation or by other suitable means. In some cases we have found it desirable in order to eliminate all except traces of water to put the mixture over a paint or an ink mill such as for example, the well known three roller mill. This milling operation not only produces a soft coherent paste suitable for use in paints, printing inks, linoleum or other articles of commerce as such or upon the addition of other constituents but also serves to remove all but negligible quantities of water which negligible quantities are not objectionable for the purposes for which the pigment in oil may be used. In some cases we have found it desirable to put the mixture through a mill several times in order to accomplish these results. In some cases also traces of water may be removed advantageously by employing a partial vacuum during the milling operation or otherwise or coupled with heating.

In some cases also it has been found desirable to apply heat during this milling operation. When a roller mill is used heat is usually applied by means of circulating hot water through tubes in the rolls. Again, however, we do not wish to be limited to any particular form of application of heat during the milling operation.

This invention may also be carried out in a so-called putty chaser mill either with or without a vacuum or either with or without the application of heat.

Having described our invention and some of its economic advantages we now give four examples whereby it may be put into practice. It is to be understood, however, that these examples are for illustrative purposes only and that no undue limitations are to be placed thereon. As broad an interpretation as is permissible in view of the prior art is desired.

*Example No. 1*

To 300 pounds of an aqueous pulp of iron blue containing 200 pounds of water and 100 pounds of iron blue is added two pounds of mono-amyl-amine ricinoleate during constant mixing. There is then added, while continuing the mixing, 100 pounds of No. 0 lithographic varnish (a type of cooked linseed oil). Mixing is continued until the water separates which usually requires about 15 minutes. The separated water is decanted and the pigment-oil paste is transferred to a three roller mill where the remainder of the water is removed and the paste is brought to a uniform smooth homogeneous condition by putting it over the mill three times according to the usual well known procedure.

Example No. 2

To 400 pounds of an aqueous pulp of a Malachite Green Phospho-Tungstic Lake, containing 100 pounds of the lake, is added 150 pounds of No. 1 lithographic varnish (a type of cooked linseed oil varnish) and the whole is thoroughly mixed. To the mixture is then added one-half pound of mono amylamine. The mixing is continued until the bulk of the water separates. This water is then removed by decantation or other suitable means. A vacuum is applied to the mixer and the temperature is slowly raised by means of a steam jacket to a temperature of about 60° C. Mixing is then continued under a partial vacuum until substantially all of the water is removed from the paste.

While this invention has been described in connection with certain specific examples thereof, it is to be understood that this has been done merely for the purpose of illustration and that the scope of this invention is not to be limited thereby.

We claim:

1. A method of transferring an aqueous pigment pulp to a pigment in oil, which comprises adding to the aqueous pulp an oil and a small amount of an amine containing at least one alkyl radical having in itself at least three carbon atoms, and mixing said ingredients without further addition until the bulk of the water of the pulp separates, leaving the pigment dispersed in the oil.

2. A method of transferring an aqueous pigment pulp to a pigment in oil, which comprises adding to the aqueous pulp an oil and a small amount of an amine which contains at least one alkyl radical having in itself at least three carbon atoms, and which is condensed with a member of the group consisting of the soap-forming acids and glyceride oils containing free fatty acids, and mixing said ingredients without further addition until the bulk of the water of the pulp separates, leaving the pigment dispersed in the oil.

3. A method of transferring an aqueous pigment pulp to a pigment in oil, which comprises adding to the aqueous pulp an oil and a small amount of mono amylamine, and mixing said ingredients without further addition until the bulk of the water of the pulp separates, leaving the pigment dispersed in the oil.

4. A method of transferring an aqueous pigment pulp to a pigment in oil, which comprises adding to the aqueous pulp an oil and a small amount of mono amylamine ricinoleate, and mixing said ingredient without further addition until the bulk of the water of the pulp separates, leaving the pigment dispersed in the oil.

5. A pigment dispersed in oil, said pigment in oil dispersion being substantially free from water and containing as a dispersing and oil-wetting agent a small amount of an alkyl amine which contains at least one alkyl radical, said radical in itself having at least three carbon atoms.

6. A pigment dispersed in oil, said pigment in oil dispersion being substantially free from water and containing as a dispersing and oil-wetting agent a small amount of an amine which contains at least one alkyl radical having in itself at least three carbon atoms, and which is condensed with a member of the group consisting of the soap-forming acids and glyceride oils containing free fatty acids.

7. A pigment dispersed in oil, said pigment in oil dispersion being substantially free from water and containing as a dispersing and oil-wetting agent a small amount of mono amylamine.

8. A pigment dispersed in oil, said pigment in oil dispersion being substantially free from water and containing as a dispersing and oil-wetting agent a small amount of mono amylamine ricinoleate.

9. A method of transferring an aqueous pigment pulp to a pigment in oil, which comprises adding to the aqueous pulp an oil and a small amount of one of the group consisting of an amine containing at least one alkyl radical having in itself at least three carbon atoms, and an amine which contains at least one alkyl radical having in itself at least three carbon atoms and which is condensed with a member of the group consisting of the soap-forming acids and glyceride oils containing free fatty acids, and mixing said ingredients to effect the separation of the bulk of the water of the pulp, leaving the pigment dispersed in the oil.

10. A pigment dispersed in oil, said pigment in oil dispersion being substantially free from water and containing as a dispersing and oil-wetting agent a small amount of one of the group consisting of an alkyl amine containing at least one alkyl radical, said radical in itself having at least three carbon atoms, and an alkyl amine which contains at least one alkyl radical having in itself at least three carbon atoms and which is condensed with a member of the group consisting of the soap-forming acids and glyceride oils containing free fatty acids.

11. The method of transferring a pigment from water to oil, which comprises agitating an aqueous pigment pulp in the oil in the presence of a non-hydroxy amine containing at least one alkyl radical having in itself at least three carbon atoms and which is condensed with a fatty acid to cause separation of the bulk of the water of the pulp, and removing the water thus separated to leave the pigment dispersed in the oil.

12. The method as claimed in claim 11 wherein said amine is mono amylamine.

13. The method as claimed in claim 11 wherein the amine is mono amylamine and the fatty acid compound contains a radical of the group consisting of oleic acid and ricinoleic acid.

LONNIE W. RYAN.
EARL KNUDT FISCHER.